US012586092B2

(12) United States Patent
Nowak et al.

(10) Patent No.: US 12,586,092 B2
(45) Date of Patent: Mar. 24, 2026

(54) INTEGRATING DATA FROM MULTIPLE UNRELATED DATA STRUCTURES

(71) Applicant: Capital One Services, LLC, McLean, VA (US)

(72) Inventors: Matthew Nowak, Midlothian, VA (US); Alexander Gurfinkel, Frisco, TX (US); Anna Husain, Chevy Chase, MD (US); Kamari Clark, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 414 days.

(21) Appl. No.: 18/297,856

(22) Filed: Apr. 10, 2023

(65) Prior Publication Data

US 2024/0338715 A1     Oct. 10, 2024

(51) Int. Cl.
| | |
|---|---|
| *G06Q 30/00* | (2023.01) |
| *G06Q 10/1093* | (2023.01) |
| *G06Q 30/0202* | (2023.01) |
| *H04W 4/029* | (2018.01) |

(52) U.S. Cl.
CPC ..... *G06Q 30/0202* (2013.01); *G06Q 10/1093* (2013.01); *H04W 4/029* (2018.02)

(58) Field of Classification Search
None
See application file for complete search history.

(56) References Cited

U.S. PATENT DOCUMENTS

| | | | | |
|---|---|---|---|---|
| 8,712,857 | B1 * | 4/2014 | Adornato | G06Q 30/0207 705/26.7 |
| 10,937,089 | B2 | 3/2021 | Nandan et al. | |
| 2015/0120555 | A1 * | 4/2015 | Jung | G06Q 50/01 705/44 |
| 2015/0371153 | A1 * | 12/2015 | Lohmeier | G06Q 40/08 705/5 |
| 2021/0358030 | A1 * | 11/2021 | Flowers | G06Q 30/0207 |
| 2022/0051270 | A1 * | 2/2022 | Benkreira | G06F 40/40 |
| 2022/0292543 | A1 * | 9/2022 | Henderson | G06Q 30/0252 |

(Continued)

OTHER PUBLICATIONS

Khatri, Jaikishan, et al. "Recognizing personality traits using consumer behavior patterns in a virtual retail store." Frontiers in psychology 13 (2022): 752073. (Year: 2022).*

(Continued)

*Primary Examiner* — Gurkanwaljit Singh
(74) *Attorney, Agent, or Firm* — Harrity & Harrity, LLP

(57) ABSTRACT

In some implementations, a device may retrieve one or more of: exchange data, account data, record data, interaction data, or metaverse data. The device may obtain at least one of location data or wireless network data, where the location data indicates a location, of a user device, associated with a first entity, and where the wireless network data indicates a wireless network, to which the user device has connected, associated with a second entity. The device may determine a probability of the user acquiring an item in a future time interval based on at least one of the exchange data, the account data, the record data, the interaction data, or the metaverse data, and at least one of first information relating to the first entity or second information relating to the second entity. The device may transmit information based on the probability of the user acquiring the item.

20 Claims, 9 Drawing Sheets

(56)                References Cited

U.S. PATENT DOCUMENTS

2023/0099627 A1 *  3/2023  Duckworth  ............  G06Q 40/03
                                                                 706/12
2023/0316372 A1 *  10/2023  Cuan  .................  G06Q 30/0631
                                                                 705/5

OTHER PUBLICATIONS

Egbuhuzor, Nnaemeka Stanley, et al. "Cloud-based CRM systems: Revolutionizing customer engagement in the financial sector with artificial intelligence." International Journal of Science and Research Archive 3.1 (2021): 215-234. (Year: 2021).*

Chaudhuri, Neha, et al. "On the platform but will they buy? Predicting customers' purchase behavior using deep learning." Decision Support Systems 149 (2021): 113622. (Year: 2021).*

Chen, Shui-xia, et al. "Customer purchase prediction from the perspective of imbalanced data: A machine learning framework based on factorization machine." Expert Systems with Applications 173 (2021): 114756. (Year: 2021).*

B. Guo, Y. Liu, Y. Ouyang, V. W. Zheng, D. Zhang and Z. Yu, "Harnessing the Power of the General Public for Crowdsourced Business Intelligence: A Survey," in IEEE Access, vol. 7, pp. 26606-26630, 2019, doi: 10.1109/ACCESS.2019.2901027 (Year: 2019 ).*

* cited by examiner

100

130

Determine a probability of a user acquiring an item in a future time interval

Prediction System

Model

Machine Learning Model Output

- Probability: 85%
- Type: Sedan
- Range: $30,000-$40,000

-Exchange Data
-Account Data
-Record Data
-Interaction Data
-Metaverse Data
-First information relating to the first entity
-Second information relating to the second entity

100

135
Transmit information (e.g., content) based on the probability

140
Determine an approval for the user to receive one or more services based on the probability 145
Configure XR content based on the probability 150
Generate a calendar appointment based on the probability 155
Generate a communication session based on the probability Prediction System User Device

300

500

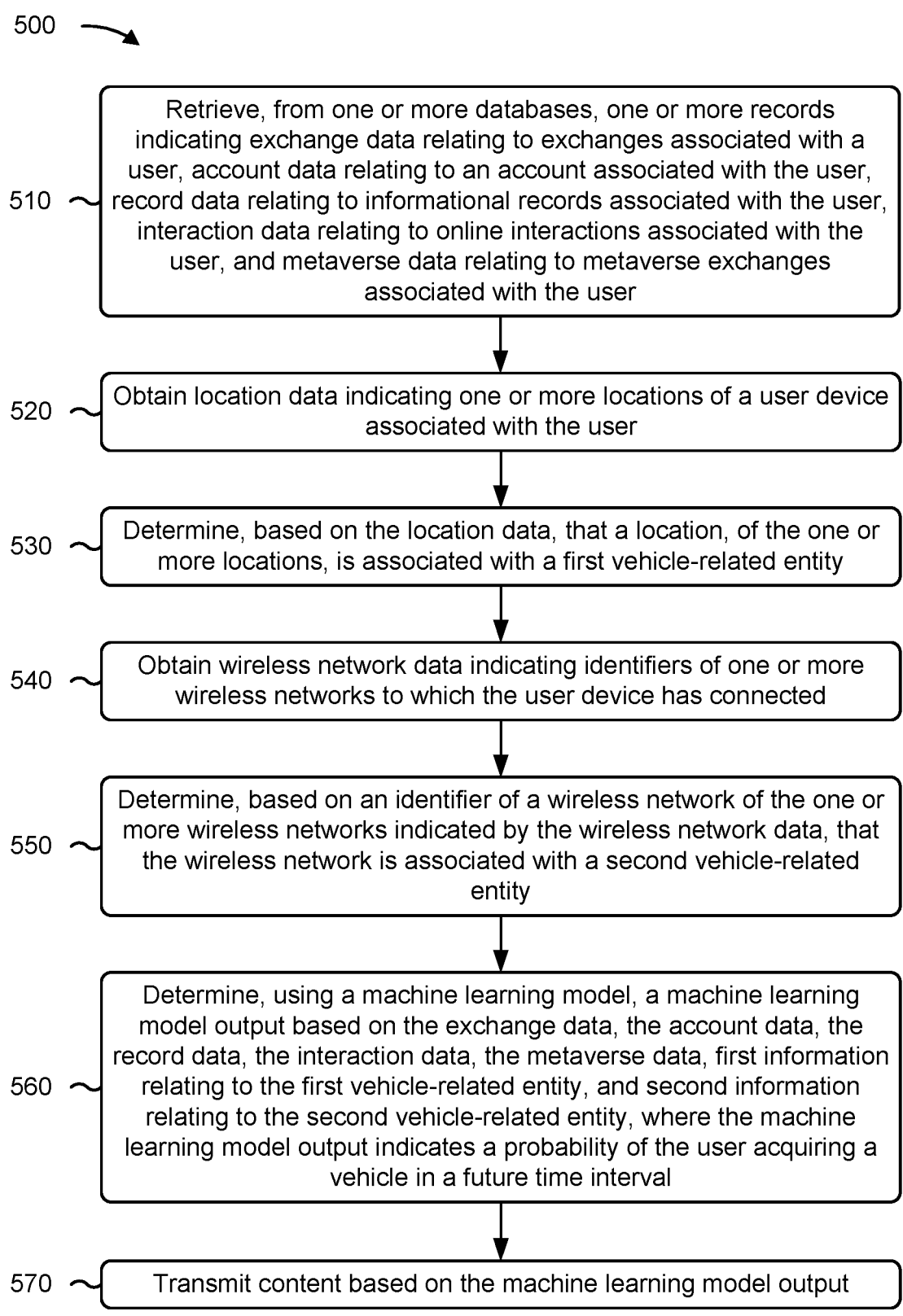

510 — Retrieve, from one or more databases, one or more records indicating exchange data relating to exchanges associated with a user, account data relating to an account associated with the user, record data relating to informational records associated with the user, interaction data relating to online interactions associated with the user, and metaverse data relating to metaverse exchanges associated with the user 520 — Obtain location data indicating one or more locations of a user device associated with the user 530 — Determine, based on the location data, that a location, of the one or more locations, is associated with a first vehicle-related entity 540 — Obtain wireless network data indicating identifiers of one or more wireless networks to which the user device has connected 550 — Determine, based on an identifier of a wireless network of the one or more wireless networks indicated by the wireless network data, that the wireless network is associated with a second vehicle-related entity 560 — Determine, using a machine learning model, a machine learning model output based on the exchange data, the account data, the record data, the interaction data, the metaverse data, first information relating to the first vehicle-related entity, and second information relating to the second vehicle-related entity, where the machine learning model output indicates a probability of the user acquiring a vehicle in a future time interval 570 — Transmit content based on the machine learning model output

FIG. 5

INTEGRATING DATA FROM MULTIPLE UNRELATED DATA STRUCTURES

BACKGROUND

Artificial intelligence describes different ways that a machine interacts with an environment. Through advanced, human-like intelligence (e.g., provided by software and hardware), an artificial intelligence system may perceive an environment and take actions that maximize a chance of achieving goals. Machine learning is an approach, or a subset, of artificial intelligence, with an emphasis on learning rather than just computer programming. A machine learning system may utilize complex models to analyze a massive amount of data, recognize patterns among the data, and generate an output (e.g., a prediction, a classification, or the like) without requiring a human to program specific instructions.

SUMMARY

Some implementations described herein relate to a system for integrating data from multiple unrelated data structures. The system may include one or more memories and one or more processors communicatively coupled to the one or more memories. The one or more processors may be configured to retrieve, from one or more databases, one or more records indicating exchange data relating to exchanges associated with a user, account data relating to an account associated with the user, record data relating to informational records associated with the user, interaction data relating to online interactions associated with the user, and metaverse data relating to metaverse exchanges associated with the user. The one or more processors may be configured to obtain location data indicating one or more locations of a user device associated with the user. The one or more processors may be configured to determine, based on the location data, that a location, of the one or more locations, is associated with a first vehicle-related entity. The one or more processors may be configured to obtain wireless network data indicating identifiers of one or more wireless networks to which the user device has connected. The one or more processors may be configured to determine, based on an identifier of a wireless network of the one or more wireless networks indicated by the wireless network data, that the wireless network is associated with a second vehicle-related entity. The one or more processors may be configured to determine, using a machine learning model, a machine learning model output based on the exchange data, the account data, the record data, the interaction data, the metaverse data, first information relating to the first vehicle-related entity, and second information relating to the second vehicle-related entity, where the machine learning model output indicates a probability of the user acquiring a vehicle in a future time interval. The one or more processors may be configured to transmit, to the user device or to another user device associated with the user, content based on the machine learning model output.

Some implementations described herein relate to a method of integrating data from multiple unrelated data structures. The method may include retrieving, from one or more databases, one or more of: exchange data relating to exchanges associated with a user, account data relating to an account associated with the user, record data relating to informational records associated with the user, interaction data relating to online interactions associated with the user, or metaverse data relating to metaverse exchanges associated with the user. The method may include obtaining at least one of location data or wireless network data associated with a user device associated with the user, where the location data indicates a location of the user device that is associated with a first vehicle-related entity, and where the wireless network data indicates a wireless network to which the user device has connected that is associated with a second vehicle-related entity. The method may include determining, using a machine learning model, a machine learning model output based on at least one of the exchange data, the account data, the record data, the interaction data, or the metaverse data, and at least one of first information relating to the first vehicle-related entity or second information relating to the second vehicle-related entity, where the machine learning model output indicates a probability of the user acquiring a vehicle in a future time interval. The method may include performing one or more actions based on the machine learning model output.

Some implementations described herein relate to a non-transitory computer-readable medium that stores a set of instructions for integrating data from multiple unrelated data structures. The set of instructions, when executed by one or more processors of a device, may cause the device to retrieve one or more of: exchange data relating to exchanges associated with a user, account data relating to an account associated with the user, record data relating to informational records associated with the user, interaction data relating to online interactions associated with the user, or metaverse data relating to metaverse exchanges associated with the user. The set of instructions, when executed by one or more processors of the device, may cause the device to obtain at least one of location data or wireless network data associated with a user device associated with the user, where the location data indicates a location of the user device that is associated with a first entity, and where the wireless network data indicates a wireless network to which the user device has connected that is associated with a second entity. The set of instructions, when executed by one or more processors of the device, may cause the device to determine a probability of the user acquiring an item in a future time interval based on at least one of the exchange data, the account data, the record data, the interaction data, or the metaverse data, and at least one of first information relating to the first entity or second information relating to the second entity. The set of instructions, when executed by one or more processors of the device, may cause the device to transmit information based on the probability of the user acquiring the item.

BRIEF DESCRIPTION OF THE DRAWINGS

FIG. 5 is a flowchart of an example process associated with integrating data from multiple unrelated data structures, in accordance with some embodiments of the present disclosure.

DETAILED DESCRIPTION

Figure 1A:
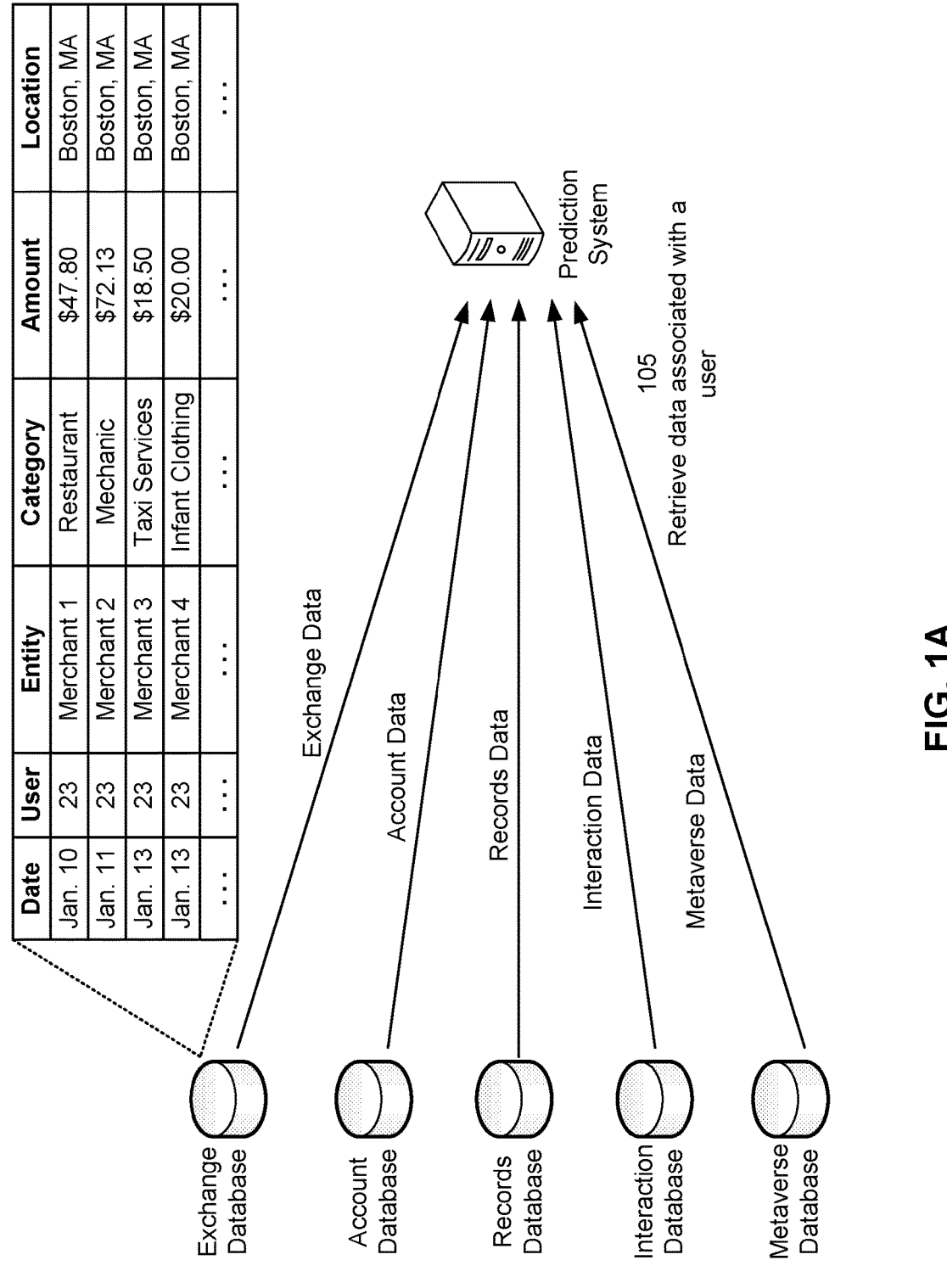
FIGS. 1A-1E are diagrams of an example associated with integrating data from multiple unrelated data structures, in accordance with some embodiments of the present disclosure.

The following detailed description of example implementations refers to the accompanying drawings. The same reference numbers in different drawings may identify the same or similar elements.

Vast amounts of data may be stored electronically in data structures (e.g., databases, blockchains, log files, cookies, or the like). A device may perform multiple queries, or other information retrieval techniques, to unrelated data structures to obtain data relevant to a particular task or computational operation. Moreover, each data structure may employ a particular schema and/or use particular data formatting conventions for data storage. Thus, the data may be incompatible and difficult to integrate into machine-usable outputs for computational instructions or automation. This incompatibility may necessitate separate handling of the data using complex instructions and/or repetitive processing to achieve desired computational outcomes or automation outcomes, thereby expending significant computing resources (e.g., processor resources and/or memory resources) and causing significant delays.

In addition, separate use of the data, such as individually presenting the data in a user interface for analysis by a user, may be inefficient. For example, the device may separately process and/or reformat data from different data structures to obtain information for presenting in the user interface, thereby expending significant computing resources. Furthermore, individually presenting the data may increase the size of a user interface (e.g., a web page) or utilize multiple user interfaces (e.g., multiple web pages). Navigating through a large user interface or a large number of user interfaces to find relevant information creates a poor user experience, consumes excessive computing resources that are needed for a client device to generate and display the user interface(s) and that are needed for one or more server devices to serve the user interface(s) to the client device, and consumes excessive network resources that are needed for communications between the client device and the server device.

Some implementations described herein enable integration of otherwise incompatible data from multiple unrelated data structures. In some implementations, a system may use a machine learning model to predict a probability of a user acquiring a new item in a future time interval (e.g., a month into the future or a year into the future) based on data that may be obtained from multiple unrelated data structures. For example, the machine learning model may determine a probability of a user acquiring a new vehicle in a future time interval based on data relating to exchanges performed by the user (e.g., transactions between the user and one or more merchants), an account associated with the user (e.g., a type of financial account held by the user, a balance of the account, a timeliness of payments for the account, or the like), public records associated with the user (e.g., a vehicle registration), online interactions associated with the user (e.g., websites that the user visited or websites at which the user performed a transaction), and/or metaverse exchanges associated with the user (e.g., transactions involving non-fungible tokens (NFTs) representing real-world objects). The machine learning model may also use information relating to one or more entities that the user has visited, which may be determined using location data and/or wire-less network connection data obtained by the system from a user device of the user. Based on the probability, the system may proactively transmit content relevant to the user and/or may proactively approve services for the user, among other examples. In some implementations, the system may configure extended reality (XR) content (e.g., a virtual showroom or a virtual test drive) for the user based on the probability.

In this way, the machine learning model enables the system to perform operations based on otherwise incompatible data while conserving computing resources and reducing delays that would otherwise result from separate handling of the data using complex instructions and/or repetitive processing. Moreover, an output of the machine learning model may convey data from the multiple unrelated databases in a smaller user interface or in a lesser number of user interfaces than otherwise would have been used to individually present data from the multiple unrelated databases. In this way, the use of computing resources and network resources is reduced in connection with serving, generating, and/or displaying the user interface(s).

FIGS. 1A-1E are diagrams of an example 100 associated with integrating data from multiple unrelated data structures. As shown in FIGS. 1A-1E, example 100 includes a prediction system, a user device, and one or more databases (e.g., an exchange database, an account database, a records database, an interaction database, and/or a metaverse database, among other examples). These devices are described in more detail in connection with FIGS. 3 and 4. The prediction system may be associated with an entity, such as a financial institution. The user device may be associated with a user. In some implementations, the user may have an account (e.g., a transaction account, such as a credit account) with the entity associated with the prediction system. Accordingly, the prediction system may have access to information associated with the user, such as account information, personal identifying information, and/or demographic information, among other examples.

The prediction system may identify a user that is to be the subject of a prediction. For example, the prediction system may periodically or continuously perform prediction for a set of users, and the user may be included in the set of users. The set of users may be account holders or potential account holders with the entity associated with the prediction system. As another example, the prediction system may identify the user based on detecting an occurrence of an event associated with the user. The event may be the user browsing a particular website (e.g., a vehicle financing website or a website for buying and selling of vehicles), the user submitting an application for services (e.g., vehicle financing services or banking services), and/or the publication of a report associated with the user (e.g., a vehicle accident report, a vehicle maintenance report, or the like), among other examples.

As shown in FIG. 1A, and by reference number 105, the prediction system may retrieve data (e.g., historical data) associated with the user. For example, the prediction system may retrieve one or more records from one or more databases (e.g., the exchange database, the account database, the records database, the interaction database, and/or the metaverse database) that indicate the data associated with the user. The prediction system may retrieve the data based on identifying that the user is to be the subject of the prediction.

The data may include (e.g., the record(s) may indicate) exchange data relating to exchanges associated with (e.g., performed by) the user. For example, the prediction system may obtain the exchange data from the exchange database (e.g., one or more databases), which may store the exchange data (e.g., transaction data, or the like). The exchange data may include one or more entries (e.g., records) respectively associated with one or more exchanges. An exchange may include a transaction or other exchange for goods and/or services between the user and an entity (e.g., a merchant). As shown, an entry of the historical exchange data may include data associated with an exchange. For example, the entry may identify a date and/or a time of the exchange, an entity associated with the exchange, a category associated with the entity, an amount of the exchange, and/or a location of the entity, among other examples.

Additionally, or alternatively, the data may include (e.g., the record(s) may indicate) account data relating to an account associated with the user (e.g., a credit card account and/or a checking account, among other examples). For example, the prediction system may obtain the account data from the account database (e.g., one or more databases), which may store the account data. The account data may include one or more entries (e.g., records) respectively associated with account events. An account event may include an inflow event or an outflow event, such as a payment (e.g., of an account balance or a portion thereof), a deposit (e.g., a direct deposit) to the account, or the like. An entry of the account data may include data associated with an account event. For example, the entry may identify a type of the account, a date and/or a time of the account event, a type of the account event (e.g., balance payment, deposit, withdrawal, or the like), and/or an amount of the account event, among other examples.

Additionally, or alternatively, the data may include (e.g., the record(s) may indicate) record data relating to informational records associated with the user (e.g., vehicle records). For example, the prediction system may obtain the record data from the records database (e.g., one or more databases), which may store the record data. The record data may include public records available from a government entity or a private information service provider. The record data may include vehicle registration information, vehicle transaction information, vehicle accident reports, vehicle citation information, and/or vehicle maintenance information. In some implementations, the prediction system may retrieve the record data via an application programming interface (API) (e.g., by transmitting a request for the record data via the API, and receiving a response indicating the record data via the API).

Additionally, or alternatively, the data may include (e.g., the record(s) may indicate) interaction data relating to online interactions associated with the user. For example, the prediction system may obtain the interaction data from the interaction database (e.g., one or more databases), which may store the interaction data. The interaction data may include one or more entries (e.g., records) respectively associated with online interactions of the user. An online interaction may include browsing a website (e.g., a vehicle-related website) or performing an exchange through a website (e.g., an exchange for a vehicle-related good or service), among other examples. An entry of the interaction data may include data associated with an online interaction. For example, the entry may identify a type of the interaction (e.g., browsing or exchange), a date and/or a time of the interaction, a webpage or website associated with the interaction, and/or an amount of the interaction (e.g., in the case of an exchange), among other examples. In some cases, the entity associated with the prediction platform may also be associated with a browser plugin or similar software (e.g., that provides online shopping discounts) that collects the interaction data.

Additionally, or alternatively, the data may include (e.g., the record(s) may indicate) metaverse data relating to metaverse exchanges associated with the user. For example, the prediction system may obtain the metaverse data from the metaverse database (e.g., one or more databases), which may store the metaverse data. The metaverse data may include one or more entries (e.g., records) respectively associated with metaverse exchanges. A metaverse exchange may include an exchange associated with an NFT (e.g., an NFT relating to a real-world object, such as a vehicle), an exchange for a digital item (e.g., a digital accessory for an avatar of the user), and/or an exchange for a real-world item that unlocks a digital item, among other examples. An entry of the metaverse data may include data associated with an metaverse exchange. For example, the entry may identify a date and/or a time of the exchange, a buyer in the exchange, a seller in the exchange, an item or an object that is the subject of the exchange, and/or an amount of the account exchange, among other examples. In some implementations, the metaverse database may be a distributed database (e.g., a blockchain), and the entries may be records (e.g., blocks) and/or smart contracts of the distributed database.

The exchange database, the accounts database, the records database, the interaction database, and/or the metaverse database may be unrelated. For example, there may be no defined relationships between data and/or schema among the exchange database, the accounts database, the records database, the interaction database, and/or the metaverse database. In some implementations, at least two of, at least three of, at least four of, or all of the exchange database, the accounts database, the records database, the interaction database, and/or the metaverse database may be unrelated to each other.

Figure 1B:
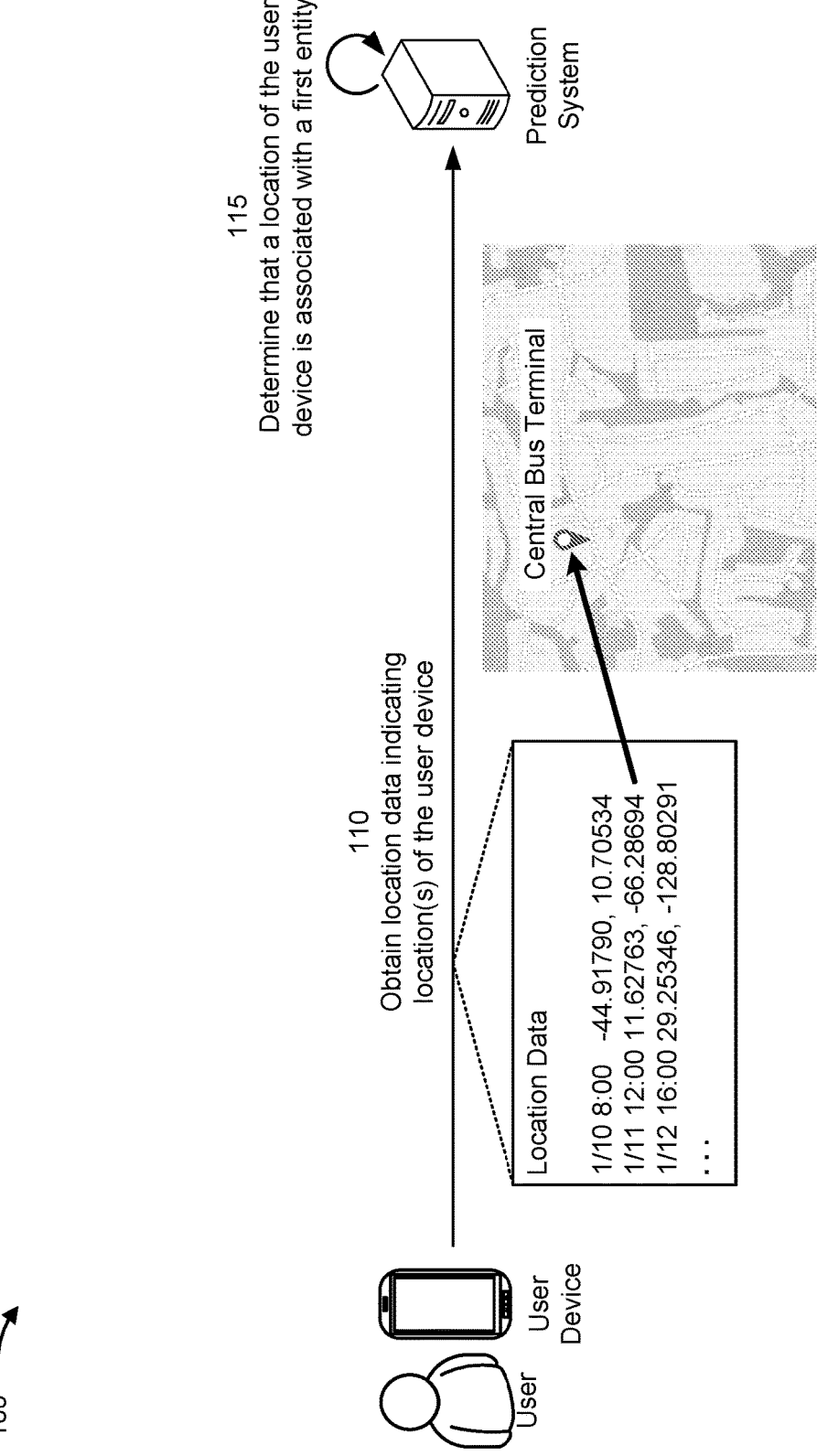

As shown in FIG. 1B, and by reference number 110, the prediction system may obtain location data indicating (e.g., using geographical coordinates) one or more locations of the user device. For example, the location data may indicate historical locations of the user device during a past time interval (e.g., a past week, a past month, or a past year). The prediction system may obtain the location data from the user device or from another device that has collected the location data from the user device.

As shown by reference number 115, based on the location data, the prediction system may determine that a location of the user device is associated with a first entity that is associated with an entity-type of interest (e.g., a vehicle-related entity type). For example, the first entity may be a first vehicle-related entity, such as a vehicle service entity (e.g., a mechanic or a service center), a vehicle dealership entity, a vehicle parts entity (e.g., a parts retail store), a private transportation entity (e.g., a bus terminal for a private bus service), or a public transportation entity (e.g., a station for a public train service), among other examples. In some implementations, the prediction system may identify one or more locations associated with the entity-type of interest.

In some implementations, the prediction system may determine that the location is associated with the first entity using map data and/or address data, among other examples. For example, the prediction system (e.g., locally or using an external service) may obtain information relating to the first entity (e.g., a name of the first entity, an address of the first entity, and/or a category associated with the first entity, among other examples) based on the geographical coordinates of the location using map data.

In some implementations, the prediction system may select the location associated with the first entity from among other locations indicated by the location data. For example, the prediction system may scan a list of locations indicated by the location data, and for each location, the prediction system may determine whether to discard the location or to flag the location based on an entity associated with the location. As an example, the prediction system may use the map data and/or the address data to determine to discard locations that are not associated with an entity-type of interest (e.g., vehicle-related entities) and to flag locations that are associated with the entity-type of interest. The prediction system may also discard locations for which an entity cannot be determined. The prediction system may use information relating to one or more locations that have been flagged by the prediction system for further operations described herein.

In some implementations, the prediction system may generate and/or store first information relating to the first entity (e.g., the first vehicle-related entity). For example, the first information may indicate an identifier of the first entity (e.g., a name of the first entity or an identifier number for the first entity that maps to information relating to the first entity), a category associated with the first entity (e.g., a merchant category indicating a type of goods and/or services provided by the first entity), and/or a frequency of user interactions with (e.g., visits to) the first entity.

Figure 1C:
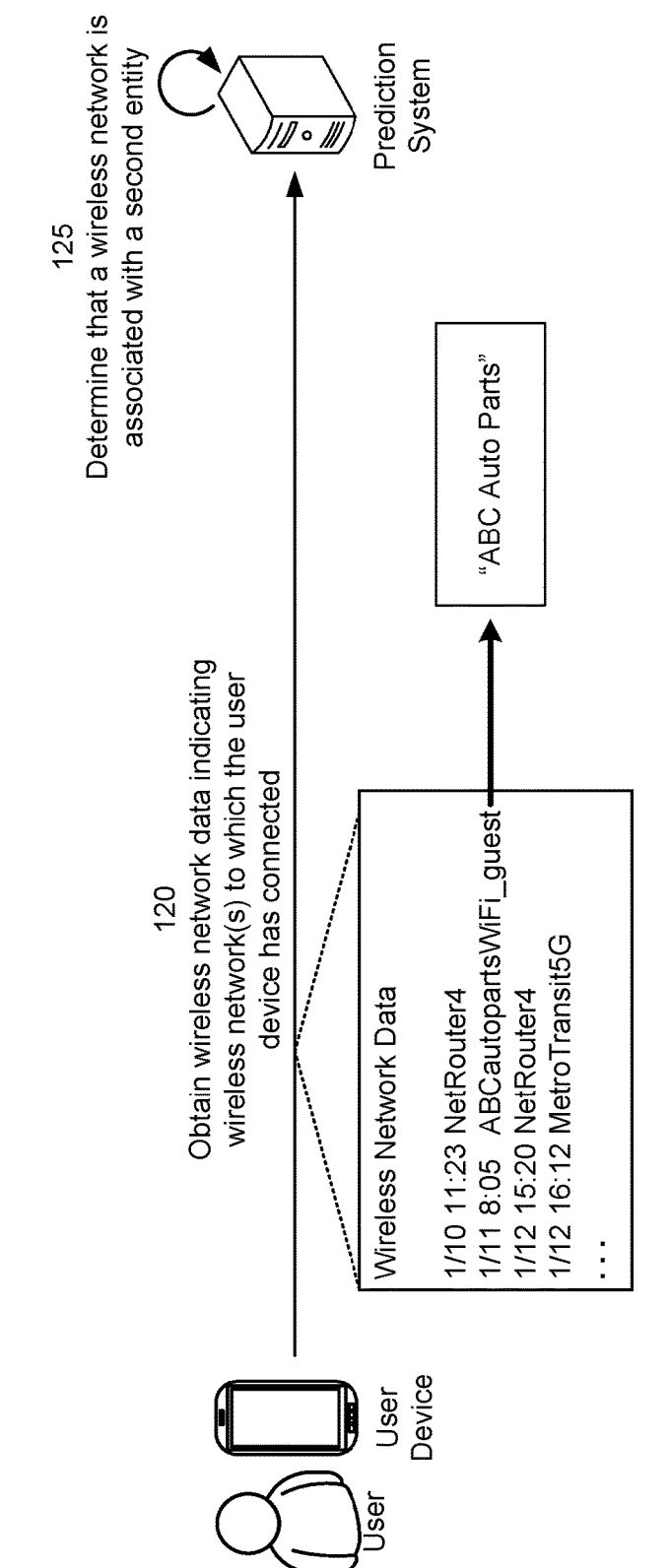

As shown in FIG. 1C, and by reference number 120, the prediction system may obtain wireless network data indicating one or more wireless networks (e.g., by identifiers of the wireless networks) to which the user device has connected. For example, the wireless network data may indicate historical wireless networks to which the user device has connected during a past time interval (e.g., a past week, a past month, or a past year), which may be the same time interval or a different time interval that is used for the location data. The one or more wireless networks may be wireless local area networks (WLANs), such as WiFi networks (e.g., WiFi endpoints). The prediction system may obtain the wireless network data from the user device or from a server device that has collected the wireless network data from the user device. In some implementations, the user device may execute an application that collects (with user permission) the location data and/or the wireless network data, and causes the user device to transmit the location data and/or the wireless network data to the prediction system or the server device.

As shown by reference number 125, based on an identifier of a wireless network indicated by the wireless network data, the prediction system may determine that the wireless network is associated with a second entity that is associated with an entity-type of interest (e.g., a vehicle-related entity type). For example, the second entity may be a second vehicle-related entity, such as a vehicle service entity, a vehicle dealership entity, a vehicle parts entity, a private transportation entity, or a public transportation entity, among other examples, as described herein. The identifier of the wireless network may be a name of the wireless network. In some implementations, the prediction system may identify one or more wireless networks associated with the entity-type of interest.

In some implementations, the prediction system may store, or may have access to, mapping information (e.g., a database, a look-up table, or the like) that maps wireless network identifiers to entities that operate the wireless networks. Accordingly, the prediction system may determine that the wireless network is associated with the second entity based on the mapping information. In some implementations, the prediction system may perform natural language processing (NLP) of the name of the wireless network, and the prediction system may determine that the wireless network is associated with the second entity based on performing NLP on the name. For example, if the name of the wireless network is "ABCautopartsWiFi_guest," then performing NLP on the name may enable the prediction system to determine that the wireless network is associated with an entity "ABC Auto Parts."

In some implementations, the prediction system may select the wireless network associated with the second entity from among other wireless networks indicated by the wireless network data. For example, the prediction system may scan a list of wireless networks indicated by the wireless network data, and for each wireless network, the prediction system may determine whether to discard the wireless network or to flag the wireless network based on an entity associated with the wireless network. As an example, the prediction system may use the mapping information and/or the NLP to determine to discard wireless networks that are not associated with an entity-type of interest (e.g., vehicle-related entities) and to flag wireless networks that are associated with the entity-type of interest. The prediction system may also discard wireless networks for which an entity cannot be determined. The prediction system may use information relating to one or more wireless networks that have been flagged by the prediction system for further operations described herein.

In some implementations, the prediction system may generate and/or store second information relating to the second entity (e.g., the second vehicle-related entity). For example, the second information may indicate an identifier of the second entity (e.g., a name of the second entity or an identifier number for the second entity that maps to information relating to the second entity), a category associated with the second entity (e.g., a merchant category indicating a type of goods and/or services provided by the second entity), and/or a frequency of user interactions with (e.g., visits to) the second entity.

Figure 1D:
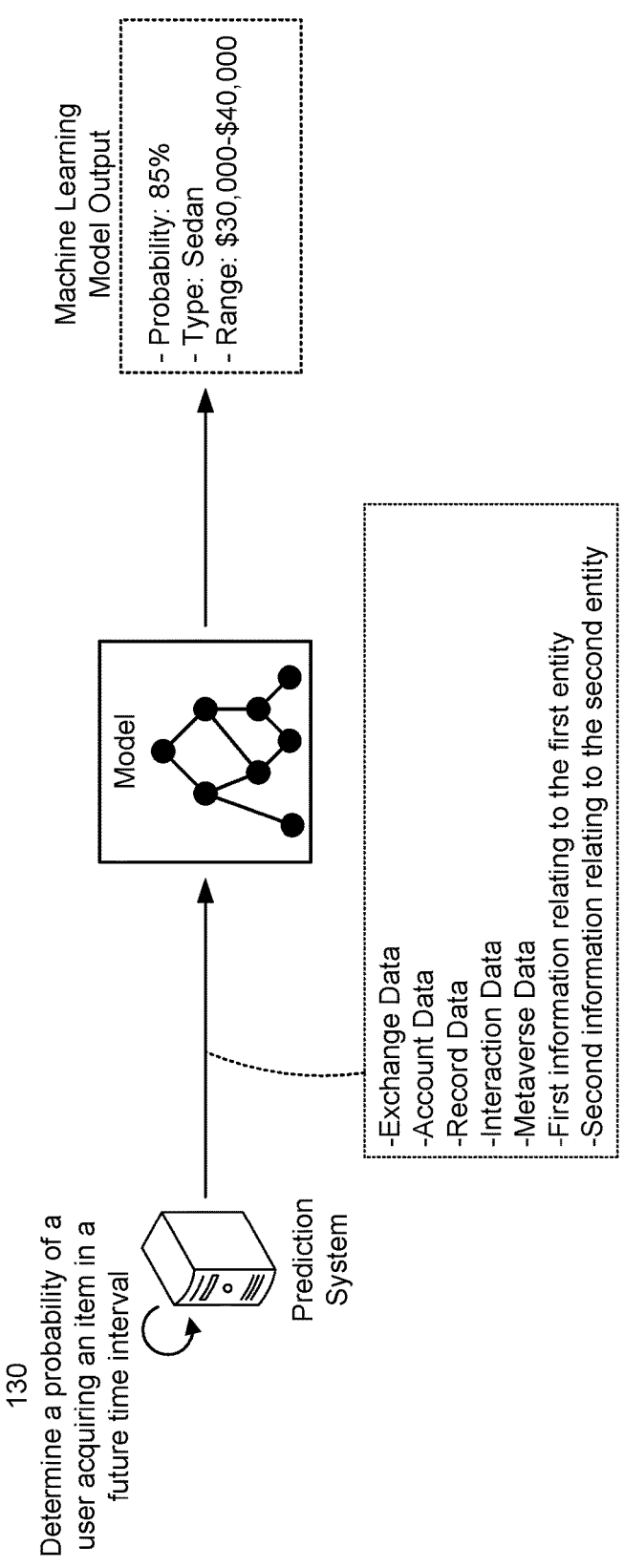

As shown in FIG. 1D, and by reference number 130, the prediction system may determine a probability of the user acquiring an item, associated with a category of interest, in a future time interval (e.g., an upcoming week, an upcoming month, or an upcoming year). The prediction system may determine the probability based on the exchange data, the account data, the record data, the interaction data, the metaverse data, the first information relating to the first entity (e.g., the first vehicle-related entity), and/or the second information relating to the second entity (e.g., the second vehicle-related entity). In some implementations, the prediction system may determine the probability based on at least one of the exchange data, the account data, the record data, the interaction data, or the metaverse data, and at least one of the first information or the second information.

The prediction system may determine the probability as a machine learning model output using a machine learning model. That is, the output may indicate the probability of the user acquiring the item (e.g., the vehicle) in the future time interval. For example, the output may indicate a level of interest (e.g., as a score, as a category, or the like) of the user in acquiring the item (e.g., the vehicle). In some implementations, the output may indicate the probability of the user acquiring the item (e.g., the vehicle), a type of the item (e.g., a type of the vehicle, such as sedan, pickup truck, motorcycle, or the like), and/or an amount range (e.g., a price range) of the item (e.g., an amount range of the vehicle, such as a cost to buy or to lease the vehicle).

Figure 2:
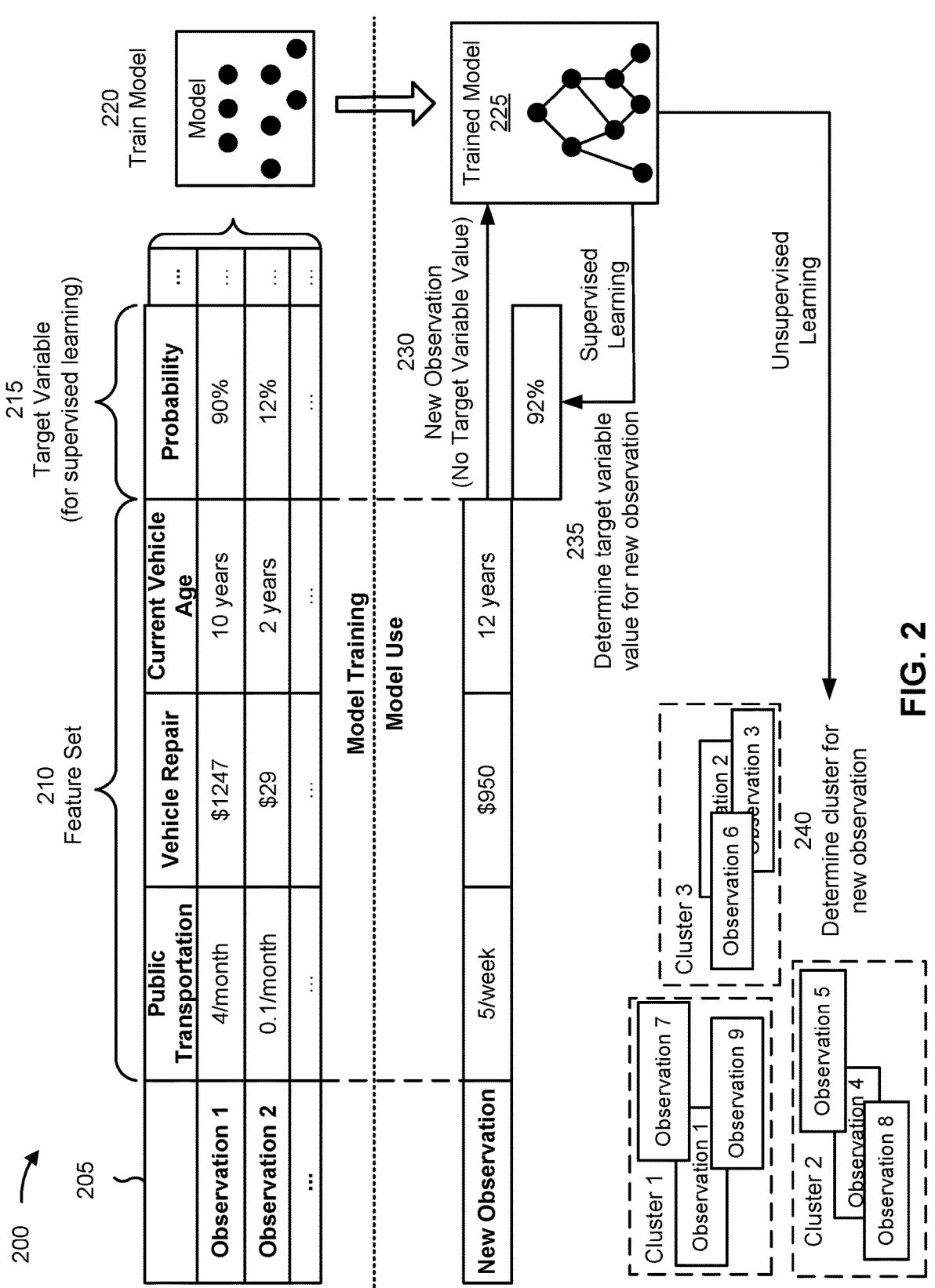
FIG. 2 is a diagram illustrating an example of training and using a machine learning model in connection with integrating data from multiple unrelated data structures, in accordance with some embodiments of the present disclosure.

In one example, as described further in connection with FIG. 2, the machine learning model may be trained to determine the output (e.g., a probability of the user acquiring a vehicle) based on a feature set that includes one or more features relating to life events of the user, a wealth level of the user, a use of public transportation by the user, and/or problems associated with a current vehicle of the user. As an example, the exchange data of the user may indicate that the user has recently performed one or more exchanges (e.g., associated with amounts that satisfy a threshold) with a vehicle service entity (e.g., an auto repair shop), that the user has not recently performed an exchange relating to a vehicle insurance payment (whereas the user previously had performed such exchanges regularly), that the user is regularly performing exchanges for public transportation tickets, that the user has not performed an exchange relating to a vehicle maintenance item (e.g., car wax) in a while (whereas the user previously had performed such exchanges regularly), and/or that the user has recently begun to make exchanges with an entity that provides goods for newborn babies. Thus, these factors may indicate to the machine learning model that the user is experiencing problems with a current vehicle, that the user is using public transportation, and/or that the user has experienced a new life event (e.g., having a baby, which can indicate that the user is in need of a bigger vehicle).

As an example, the account data may indicate that the user has a credit card account associated with a credit card type available only to users with a high credit score, that the user regularly pays a balance of the credit card account in full, that a balance of a checking account of the user is stable over time, and/or that a direct deposit to the checking account indicates a high salary of the user. Thus, these factors may indicate to the machine learning model that the user has a high wealth level (e.g., which indicates a price level for a new vehicle that the user can afford). As an example, the record data may indicate that the user acquired a current vehicle more than ten years prior. Thus, this factor may indicate to the machine learning model that the user is experiencing problems with the current vehicle.

As an example, the interaction data may indicate that the user has visited or performed an exchange with a website that provides auto parts, that the user has visited or performed an exchange with a website that provides high-end goods, and/or that the user has visited or performed an exchange with a website that provides information and/or goods relating to newborn babies. Thus, these factors may indicate to the machine learning model that the user is experiencing problems with a current vehicle, that the user has a high wealth level, and/or that the user has experienced a new life event (e.g., having a baby). As an example, the metaverse data may indicate that the user has transferred an NFT associated with a current vehicle of the user and/or that the user has acquired a digital item that is associated with real-world auto part discounts. Thus, these factors may indicate to the machine learning model that the user is experiencing problems with a current vehicle and/or that the user is using public transportation.

As an example, the first information relating to the first entity (e.g., the first vehicle-related entity) may indicate that the user has visited an auto parts store, a mechanic, or a maternity hospital. Thus, the first information may indicate to the machine learning model that the user is experiencing problems with a current vehicle and/or that the user has experienced a new life event (e.g., having a baby). As an example, the second information relating to the second entity (e.g., the second vehicle-related entity) may indicate to the machine learning model that the user has connected to a wireless network associated with, and therefore has visited, a public transportation system or a vehicle dealership. Thus, the second information may indicate that the user is using public transportation and/or that the user is experiencing problems with a current vehicle.

Figure 1E:
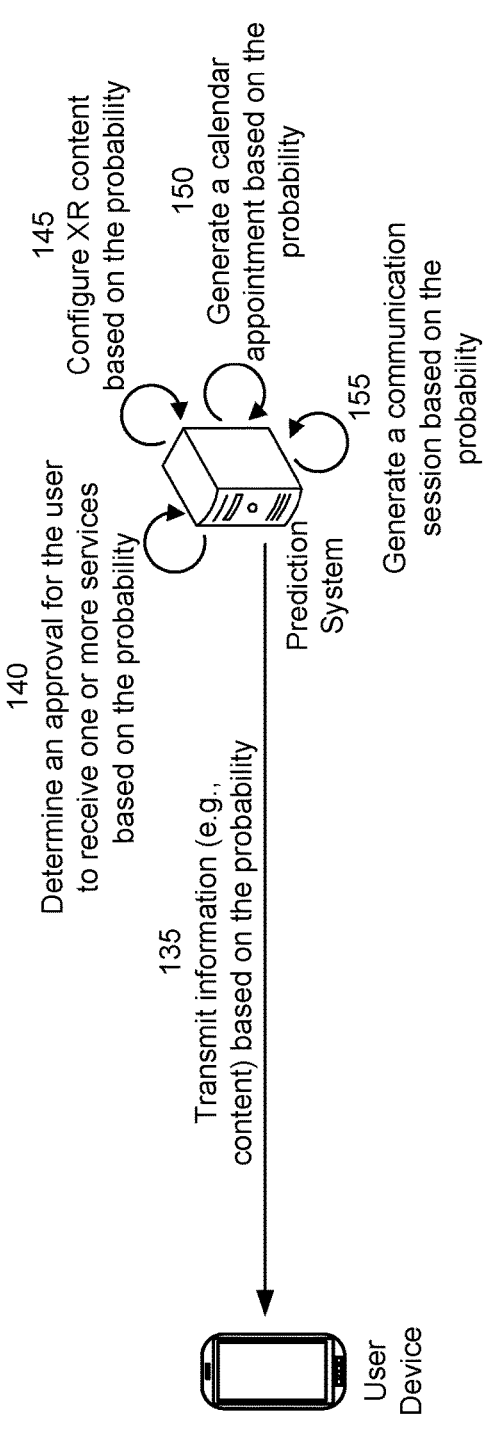

As shown in FIG. 1E, the prediction system may perform one or more actions based on the probability of the user acquiring the item (e.g., as indicated by the machine learning model output). As shown by reference number 135, an action may include transmitting information based on the probability/machine learning model output (e.g., the prediction system may proactively transmit the information based on the output indicating at least a threshold probability of the user acquiring the new item). For example, the prediction system may transmit the information to the user device, to another user device associated with the user, to another user device associated with a different user, or to a server device. The information may identify the user, the future time interval, the item (e.g., the vehicle), the type of the item, and/or the amount range of the item, among other examples.

In some implementations, the prediction system may generate and/or transmit or cause another device to generate and/or transmit, to the user device or to another user device associated with the user, content (e.g., marketing content) based on the machine learning model output. For example, the content may relate to the item (e.g., to the vehicle). As an example, the content may include information relating to the item, may include an offer for purchasing the item, and/or may include a content element configured to, responsive to a user interaction, direct an application of the user device to a user interface that enables purchase of the item or that enables applying for services (e.g., financing services) relating to the item. The prediction system may transmit the content in an email message or as text content and/or graphical content for presentation in a web page. In some implementations, the content may include XR content (e.g., associated with a virtual showroom or a virtual test drive), as described below.

As shown by reference number 140, an action may include determining, based on the probability/machine learning model output, an approval for the user to receive one or more services in connection with acquiring the item (e.g., the vehicle). For example, if the output indicates at least a threshold probability of the user acquiring a vehicle, then the prediction system may determine whether the user is approved for financing for the vehicle. The prediction system may transmit or cause another device to transmit, information indicating the approval for the user (e.g., the prediction system may proactively transmit the information based on the output indicating a threshold probability of the user acquiring the item).

As shown by reference number 145, an action may include configuring XR content based on the probability/machine learning model output (e.g., the prediction system may proactively configure the XR content based on the output indicating a threshold probability of the user acquiring the item). For example, if the output indicates at least a threshold probability of the user acquiring a vehicle (e.g., a particular type of vehicle in a particular price range), then the prediction system may configure XR content relating to the vehicle (e.g., relating to the particular type of vehicle in the particular price range). The XR content may include a virtual showroom for viewing the vehicle and/or a virtual test drive of the vehicle. The prediction system may cause presentation of the XR content on an XR device (e.g., the user device or another user device of the user). For example, the prediction system may transmit or cause another device to transmit the XR content to the user device or another user device of the user. Transmitting the XR content may include transmitting a link to the XR content, transmitting an application package for displaying the XR content, transmitting a file for displaying the XR content, and/or transmitting a stream of the XR content.

As shown by reference number 150, an action may include generating a calendar appointment based on the probability/machine learning model output (e.g., the prediction system may proactively generate the calendar appointment based on the output indicating at least a threshold probability of the user acquiring the item). The calendar appointment may be for the user to visit a showroom to see the item (e.g., to visit a vehicle showroom) and/or for the user to test or receive a demonstration of the item (e.g., for the user to test drive the vehicle). The prediction system may transmit information associated with the generated calendar appointment to the user device or another user device of the user.

In some implementations, the prediction system may identify a particular item for the user based on the probability/machine learning model output. For example, the prediction system may access (e.g., via a database, via an API, or the like) inventory information of one or more entities that provide the item (e.g., inventories of vehicles of one or more vehicle dealerships), and select the particular item for the user (e.g., a particular vehicle) from an inventory of an entity. Here, the calendar appointment may relate to the particular item (e.g., a location for the calendar appointment may be a location of the entity). Additionally, or alternatively, the XR content, described above, may relate to the particular item. In some implementations, the prediction system may transmit a request (e.g., to a device of the entity) to reserve the particular item for the user.

As shown by reference number 155, an action may include generating a communication session (e.g., a video call session, a voice call session, a chat session, or the like) based on the probability/machine learning model output (e.g., the prediction system may proactively generate the communication session based on the output indicating at least a threshold probability of the user acquiring the item). The communication session may be for the user to receive a consultation relating to the item (e.g., the vehicle). The prediction system may transmit information associated with the generated communication session to the user device or another user device of the user to enable the user to join the communication session.

In this way, the machine learning model enables the prediction system to perform operations based on otherwise incompatible data from multiple unrelated data structures while conserving computing resources and reducing delays that would otherwise result from separate handling of the data using complex instructions and/or repetitive processing. In some implementations, the prediction system may determine whether the user actually acquired the item (e.g., based on public records and/or based on exchanges performed by the user, among other examples). The prediction system may provide, to the machine learning model, feedback data for training the machine learning model indicating whether the user acquired the item, thereby further improving an accuracy of the machine learning model.

As indicated above, FIGS. 1A-1E are provided as an example. Other examples may differ from what is described in connection with FIGS. 1A-1E.

FIG. 2 is a diagram illustrating an example 200 of training and using a machine learning model in connection with integrating data from multiple unrelated data structures. The machine learning model training and usage described herein may be performed using a machine learning system. The machine learning system may include or may be included in a computing device, a server, a cloud computing environment, or the like, such as the prediction system described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the prediction system, a user device, and/or one or more databases (e.g., the exchange database, the account database, the records database, the interaction database, and/or the metaverse database), as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the prediction system, a user device, and/or one or more databases. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of "public transportation," a second feature of "vehicle repair," a third feature of "current vehicle age," and so on. As shown, for a first observation, the first feature may have a value of four times per month, the second feature may have a value of $1247, the third feature may have a value of 10 years, and so on. These features and feature values are provided as examples, and may differ in other examples. For example, the feature set may include one or more of the following features: frequency, quantity, and/or value of exchanges in an infant category, frequency, quantity, and/or value of exchanges in a vehicle servicing category, frequency, quantity, and/or value of exchanges in a transportation category, average time to pay off credit card balance, average monthly credit card balance, type of credit card account, average monthly checking account balance, average monthly direct deposits into checking account, current vehicle age, whether a current vehicle is owned or leased, quantity of vehicle accidents, frequency and/or quantity of times visiting a website in an infant category, frequency and/or quantity of times visiting a website in a vehicle repair category, frequency and/or quantity of times visiting a website in a transportation category, frequency and/or quantity of times visiting a website in a high-end goods category, whether an NFT associated with a vehicle has been acquired or transferred, whether a digital item associated with a vehicle has been acquired or transferred, frequency and/or quantity of times that a location of a user device is at a merchant in an infant category, frequency and/or quantity of times that a location of a user device is at a merchant in a vehicle servicing category, frequency and/or quantity of times that a location of a user device is at a merchant in a vehicle dealership category, frequency and/or quantity of times that a location of a user device is at a merchant in a transportation category, frequency and/or quantity of times that a user device has connected to a wireless network of an entity associated with an infant category, frequency and/or quantity of times that a user device has connected to a wireless network of an entity associated with a vehicle servicing category, frequency and/or quantity of times that a user device has connected to a wireless network of an entity associated with a car dealership category, and/or frequency and/or quantity of times that a user device has connected to a wireless network of an entity associated with a vehicle dealership category, among other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is "probability," which has a value of 90% for the first observation (e.g., representing a probability that a user will acquire a vehicle in a future time interval).

The feature set and target variable described above are provided as examples, and other examples may differ from what is described above. For example, for a target variable of a probability that a user will acquire an item (other than a vehicle), the feature set may be similar to the feature set described above using features relating to the item rather than to a vehicle.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. For example, using a neural network algorithm, the machine learning system may train a machine learning model to output (e.g., at an output layer) a probability that a user will acquire an item (e.g., a vehicle) based on an input (e.g., at an input layer) of data relating to the user, as described elsewhere herein. In particular, the machine learning system, using the neural network algorithm, may train the machine learning model, using the set of observations from the training data, to derive weights for one or more nodes in the input layer, in the output layer, and/or in one or more hidden layers (e.g., between the input layer and the output layer). Nodes in the input layer may represent features of a feature set of the machine learning model, such as a first node representing public transportation, a second node representing vehicle repair, a third node representing current vehicle age, and so forth. One or more nodes in the output layer may represent output(s) of the machine learning model, such as a node indicating the probability. The weights learned by the machine learning model facilitate transformation of the input of the machine learning model to the output of the machine learning model. After training, the machine learning system may store the machine learning model as a trained machine learning model 225 to be used to analyze new observations.

As an example, the machine learning system may obtain training data for the set of observations based on historical exchange data, account data, records data, interaction data, metaverse data, location data, and/or wireless network connection data associated with one or more users. For example, the machine learning system may obtain the historical data from one or more databases (e.g., the exchange database, the account database, the records database, the interaction database, and/or the metaverse database) and/or one or more user devices, as described elsewhere herein.

As shown by reference number 230, the machine learning system may apply the trained machine learning model 225 to a new observation, such as by receiving a new observation and inputting the new observation to the trained machine learning model 225. As shown, the new observation may include a first feature of "public transportation," a second feature of "vehicle repair," a third feature of "current vehicle age," and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of 92% for the target variable of "probability" for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, a recommendation of an account for a user that facilitates acquisition of an item (e.g., a vehicle). The first automated action may include, for example, transmitting information, configuring XR content, generating a calendar appointment, or the like.

As another example, if the machine learning system were to predict a value of 10% for the target variable of "probability," then the machine learning system may provide a second (e.g., different) recommendation (e.g., a recommendation of a service center for an item) and/or may perform or cause performance of a second (e.g., different) automated action.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., associated with users highly likely to acquire a new item), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., associated with users unlikely to acquire a new item), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model). For example, the feedback information may indicate whether a user acquired an item (e.g., a vehicle).

In this way, the machine learning system may apply a rigorous and automated process to determine a probability of a user acquiring an item. The machine learning system may enable recognition and/or identification of tens, hundreds, thousands, or millions of features and/or feature values for tens, hundreds, thousands, or millions of observations, thereby increasing accuracy and consistency and reducing delay associated with determining a probability of a user acquiring an item relative to requiring computing resources to be allocated for tens, hundreds, or thousands of operators to manually determine a probability of a user acquiring an item using the features or feature values.

As indicated above, FIG. 2 is provided as an example. Other examples may differ from what is described in connection with FIG. 2.

Figure 3:
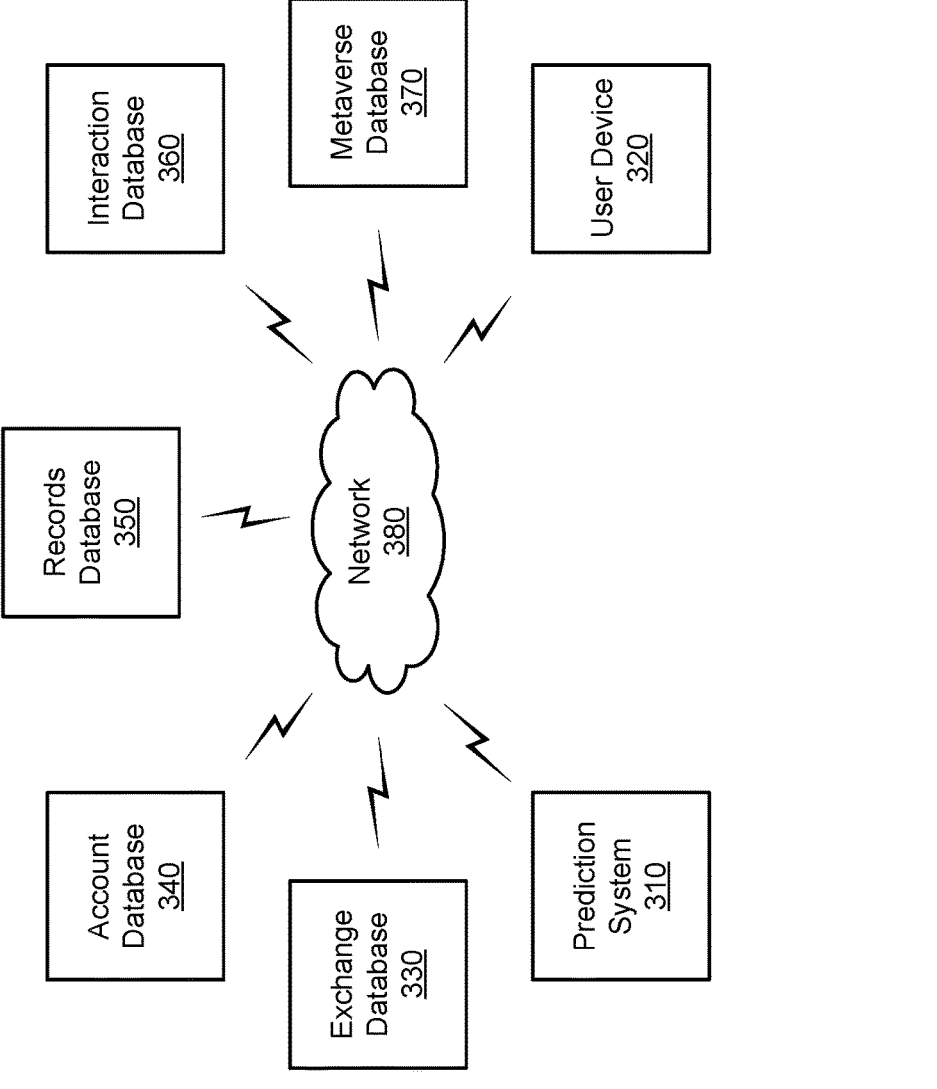
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a prediction system 310, a user device 320, an exchange database 330, an account database 340, a records database 350, an interaction database 360, a metaverse database 370, and a network 380. Devices of environment 300 may interconnect via wired connections, wireless connections, or a combination of wired and wireless connections.

The prediction system 310 may include one or more devices capable of receiving, generating, storing, processing, providing, and/or routing information associated with integrating data from multiple unrelated data structures, as described elsewhere herein. The prediction system 310 may include a communication device and/or a computing device. For example, the prediction system 310 may include a server, such as an application server, a client server, a web server, a database server, a host server, a proxy server, a virtual server (e.g., executing on computing hardware), or a server in a cloud computing system. In some implementations, the prediction system 310 may include computing hardware used in a cloud computing environment.

The user device 320 may include one or more devices capable of receiving, generating, storing, processing, and/or providing information associated with location data and/or wireless network data, as described elsewhere herein. The user device 320 may include a communication device and/or a computing device. For example, the user device 320 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The exchange database 330 may include one or more devices capable of receiving, generating, storing, processing, and/or providing information associated with exchange data, as described elsewhere herein. The exchange database 330 may include a communication device and/or a computing device. For example, the exchange database 330 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the exchange database 330 may store exchange data relating to one or more exchanges (e.g., transactions) between one or more users and one or more entities (e.g., merchants), as described elsewhere herein.

The account database 340 may include one or more devices capable of receiving, generating, storing, processing, and/or providing information associated with account data, as described elsewhere herein. The account database 340 may include a communication device and/or a computing device. For example, the account database 340 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the account database 340 may store account data relating to accounts maintained by an entity for one or more users, as described elsewhere herein.

The records database 350 may include one or more devices capable of receiving, generating, storing, processing, and/or providing information associated with records data, as described elsewhere herein. The records database 350 may include a communication device and/or a computing device. For example, the records database 350 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the records database 350 may store records data relating to one or more public records, as described elsewhere herein.

The interaction database 360 may include one or more devices capable of receiving, generating, storing, processing, and/or providing information associated with interaction data, as described elsewhere herein. The interaction database 360 may include a communication device and/or a computing device. For example, the interaction database 360 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the interaction database 360 may store interaction data relating to online interactions of one or more users, as described elsewhere herein.

The metaverse database 370 may include one or more devices capable of receiving, generating, storing, processing, and/or providing information associated with metaverse data, as described elsewhere herein. The metaverse database 370 may include a communication device and/or a computing device. For example, the metaverse database 370 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the metaverse database 370 may store metaverse data relating to one or more metaverse exchanges of one or more users, as described elsewhere herein.

The network 380 may include one or more wired and/or wireless networks. For example, the network 380 may include a wireless wide area network (e.g., a cellular network or a public land mobile network), a local area network (e.g., a wired local area network or a WLAN, such as a Wi-Fi network), a personal area network (e.g., a Bluetooth network), a near-field communication network, a telephone network, a private network, the Internet, and/or a combination of these or other types of networks. The network 380 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
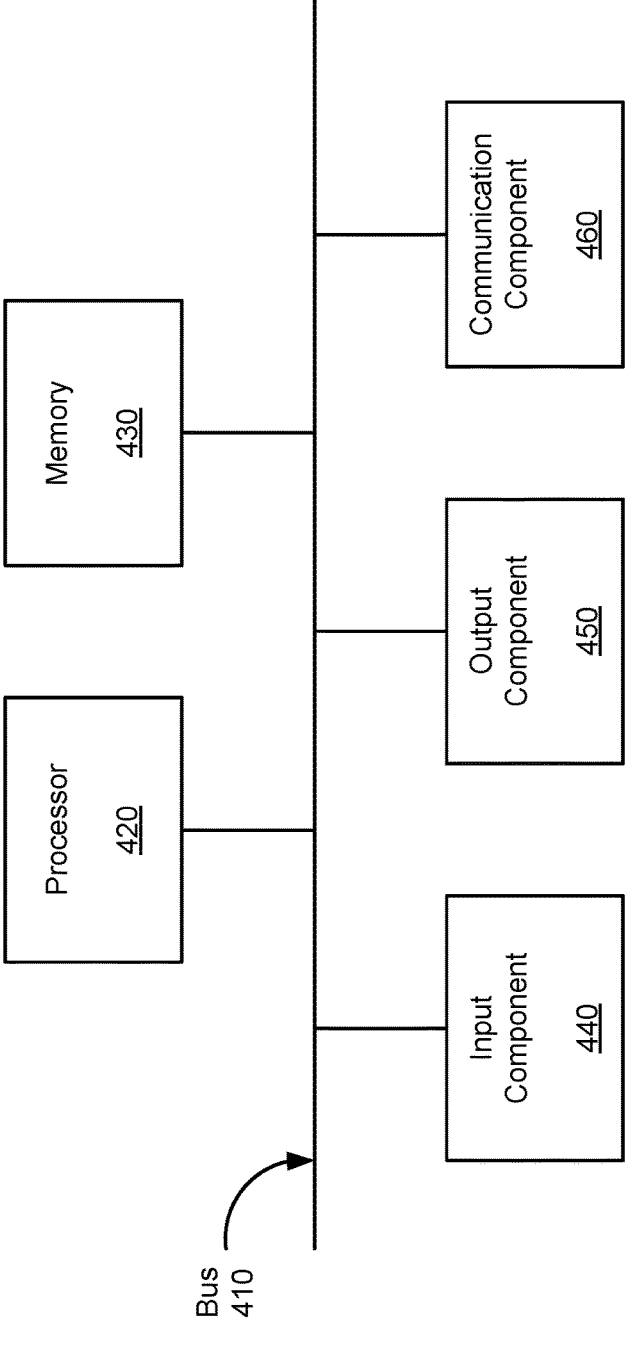
FIG. 4 is a diagram of example components of a device associated with integrating data from multiple unrelated data structures, in accordance with some embodiments of the present disclosure.

FIG. 4 is a diagram of example components of a device 400 associated with integrating data from multiple unrelated data structures. The device 400 may correspond to prediction system 310, user device 320, exchange database 330, account database 340, records database 350, interaction database 360, and/or metaverse database 370. In some implementations, prediction system 310, user device 320, exchange database 330, account database 340, records database 350, interaction database 360, and/or metaverse database 370 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 associated with integrating data from multiple unrelated data structures. In some implementations, one or more process blocks of FIG. 5 may be performed by the prediction system 310. In some implementations, one or more process blocks of FIG. 5 may be performed by another device or a group of devices separate from or including the prediction system 310, such as the user device 320, the exchange database 330, the account database 340, the records database 350, the interaction database 360, and/or the metaverse database 370. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include retrieving, from one or more databases, one or more records indicating exchange data relating to exchanges associated with a user, account data relating to an account associated with the user, record data relating to informational records associated with the user, interaction data relating to online interactions associated with the user, and metaverse data relating to metaverse exchanges associated with the user (block 510). For example, the prediction system 310 (e.g., using processor 420, memory 430, and/or communication component 460) may retrieve, from one or more databases, one or more records indicating exchange data relating to exchanges associated with a user, account data relating to an account associated with the user, record data relating to informational records associated with the user, interaction data relating to online interactions associated with the user, and metaverse data relating to metaverse exchanges associated with the user, as described above in connection with reference number 105 of FIG. 1A. As an example, the exchange database, the accounts database, the records database, the interaction database, and/or the metaverse database may be unrelated.

As further shown in FIG. 5, process 500 may include obtaining location data indicating one or more locations of a user device associated with the user (block 520). For example, the prediction system 310 (e.g., using processor

420, memory 430, and/or communication component 460) may obtain location data indicating one or more locations of a user device associated with the user, as described above in connection with reference number 110 of FIG. 1B. As an example, the location data may indicate historical locations of the user device during a past time interval (e.g., a past week, a past month, or a past year).

As further shown in FIG. 5, process 500 may include determining, based on the location data, that a location, of the one or more locations, is associated with a first vehicle-related entity (block 530). For example, the prediction system 310 (e.g., using processor 420 and/or memory 430) may determine, based on the location data, that a location, of the one or more locations, is associated with a first vehicle-related entity, as described above in connection with reference number 115 of FIG. 1B. As an example, the location may be determined to be associated with the first entity using map data and/or address data, among other examples. For example, information relating to the first entity (e.g., a name of the first entity, an address of the first entity, and/or a category associated with the first entity, among other examples) may be obtained based on geographical coordinates of the location using map data.

As further shown in FIG. 5, process 500 may include obtaining wireless network data indicating identifiers of one or more wireless networks to which the user device has connected (block 540). For example, the prediction system 310 (e.g., using processor 420, memory 430, and/or communication component 460) may obtain wireless network data indicating identifiers of one or more wireless networks to which the user device has connected, as described above in connection with reference number 120 of FIG. 1C. As an example, the wireless network data may indicate historical wireless networks to which the user device has connected during a past time interval (e.g., a past week, a past month, or a past year).

As further shown in FIG. 5, process 500 may include determining, based on an identifier of a wireless network of the one or more wireless networks indicated by the wireless network data, that the wireless network is associated with a second vehicle-related entity (block 550). For example, the prediction system 310 (e.g., using processor 420 and/or memory 430) may determine, based on an identifier of a wireless network of the one or more wireless networks indicated by the wireless network data, that the wireless network is associated with a second vehicle-related entity, as described above in connection with reference number 125 of FIG. 1C. As an example, NLP of the name of the wireless network may be performed to determine that the wireless network is associated with the second entity.

As further shown in FIG. 5, process 500 may include determining, using a machine learning model, a machine learning model output based on the exchange data, the account data, the record data, the interaction data, the metaverse data, first information relating to the first vehicle-related entity, and second information relating to the second vehicle-related entity, where the machine learning model output indicates a probability of the user acquiring a vehicle in a future time interval (block 560). For example, the prediction system 310 (e.g., using processor 420 and/or memory 430) may determine, using a machine learning model, a machine learning model output based on the exchange data, the account data, the record data, the interaction data, the metaverse data, first information relating to the first vehicle-related entity, and second information relating to the second vehicle-related entity, as described above in connection with reference number 130 of FIG. 1D. As an example, the machine learning model may be trained to determine the output based on a feature set that includes one or more features relating to life events of the user, a wealth level of the user, a use of public transportation by the user, and/or problems associated with a current vehicle of the user. In some implementations, the machine learning model output indicates a probability of the user acquiring a vehicle in a future time interval.

As further shown in FIG. 5, process 500 may include transmitting, to the user device or to another user device associated with the user, content based on the machine learning model output (block 570). For example, the prediction system 310 (e.g., using processor 420, memory 430, and/or communication component 460) may transmit, to the user device or to another user device associated with the user, content based on the machine learning model output, as described above in connection with reference number 135 of FIG. 1E. As an example, the content may include information relating to the vehicle, may include an offer for purchasing the vehicle, and/or may include a content element configured to, responsive to a user interaction, direct an application of the user device to a user interface that enables purchase of the vehicle or that enables applying for services (e.g., financing services) relating to the vehicle.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1E. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code-it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for integrating data from multiple unrelated data structures, the system comprising:

one or more memories; and one or more processors, communicatively coupled to the one or more memories, configured to:

retrieve, from one or more databases, one or more records indicating exchange data relating to exchanges associated with a user, account data relating to an account associated with the user, record data relating to informational records associated with the user, interaction data relating to online interactions associated with the user, and metaverse data relating to metaverse exchanges associated with the user;

obtain location data indicating one or more locations of a user device associated with the user;

determine, based on the location data, that a location, of the one or more locations, is associated with a first vehicle-related entity;

obtain wireless network data indicating identifiers of one or more wireless networks to which the user device has connected;

determine, based on an identifier of a wireless network of the one or more wireless networks indicated by the wireless network data, that the wireless network is associated with a second vehicle-related entity;

determine, using a machine learning model, a machine learning model output based on the exchange data, the account data, the record data, the interaction data, the metaverse data, first information relating to the first vehicle-related entity, and second information relating to the second vehicle-related entity, wherein each type of data, that the machine learning model output is based on, are incompatible from each other and from different data structures, and wherein the machine learning model output indicates a probability of the user acquiring a vehicle in a future time interval;

transmit, to the user device or to another user device associated with the user, content based on the machine learning model output; and perform, based on transmitting the content, at least one action associated with:

configuring an extended reality content based on the machine learning model output, or generating a new communication session based on the machine learning model output.

2. The system of claim 1, wherein the first information relating to the first vehicle-related entity indicates at least one of a first identifier of the first vehicle-related entity, a first category associated with the first vehicle-related entity, or a first frequency of user interactions with the first vehicle-related entity, and wherein the second information relating to the second vehicle-related entity indicates at least one of a second identifier of the second vehicle-related entity, a second category associated with the second vehicle-related entity, or a second frequency of user interactions with the second vehicle-related entity.

3. The system of claim 1, wherein the one or more processors, to retrieve the one or more records indicating the exchange data, the account data, the record data, the interaction data, and the metaverse data, are configured to:

retrieve the exchange data from a first database, the account data from a second database, the record data from a third database, the interaction data from a fourth database, and the metaverse data from a fifth database, wherein the first database, the second database, the third database, the fourth database, and the fifth database are unrelated.

4. The system of claim 1, wherein the machine learning model is trained to determine the machine learning model output based on a feature set that includes one or more features relating to life events of the user, a wealth level of the user, a use of public transportation by the user, or problems associated with a current vehicle of the user.

5. The system of claim 1, wherein the content includes information relating to the vehicle.

6. The system of claim 1, wherein the content is extended reality content relating to the vehicle.

7. The system of claim 1, wherein the one or more processors are further configured to:

determine whether the user acquired the vehicle; and provide, to the machine learning model, feedback data for training the machine learning model indicating whether the user acquired the vehicle.

8. The system of claim 1, wherein the machine learning model output indicates the probability of the user acquiring the vehicle, a type of the vehicle, and an amount range of the vehicle.

9. The system of claim 1, wherein the one or more processors are configured to:

update the machine learning model based on feedback data indicating whether the user completed a transaction using the machine learning model output.

10. A method of integrating data from multiple unrelated data structures, comprising:

retrieving, from one or more databases, one or more of: exchange data relating to exchanges associated with a user, account data relating to an account associated with the user, record data relating to informational records associated with the user, interaction data relating to online interactions associated with the user, or metaverse data relating to metaverse exchanges associated with the user;

obtaining at least one of location data or wireless network data associated with a user device associated with the user, wherein the location data indicates a location of the user device that is associated with a first vehicle-related entity, and wherein the wireless network data indicates a wireless network to which the user device has connected that is associated with a second vehicle-related entity;

determining, using a machine learning model, a machine learning model output based on at least one of the exchange data, the account data, the record data, the interaction data, or the metaverse data, and at least one of first information relating to the first vehicle-related entity or second information relating to the second vehicle-related entity, wherein each type of data, that the machine learning model output is based on, are incompatible from each other and from different data structures, and wherein the machine learning model output indicates a probability of the user acquiring a vehicle in a future time interval; and performing one or more actions based on the machine learning model output, wherein the one or more actions are associated with at least one of:

configuring an extended reality content based on the machine learning model output, or generating a new communication session based on the machine learning model output.

11. The method of claim 10, further comprising:

transmitting content based on the machine learning model output.

12. The method of claim 10, wherein performing the one or more actions comprises:

determining, based on the machine learning model output indicating the probability of the user acquiring the vehicle, an approval for the user to receive one or more services in connection with acquiring the vehicle; and transmitting information indicating the approval for the user.

13. The method of claim 10, further comprising:

performing natural language processing of a name of the wireless network; and determining that the wireless network is associated with the second vehicle-related entity based on performing natural language processing of the name.

14. The method of claim 10, wherein the machine learning model is trained to determine the machine learning model output based on a feature set that includes one or more features relating to life events of the user, a wealth level of the user, a use of public transportation by the user, or problems associated with a current vehicle of the user.

15. The method of claim 10, further comprising:

updating the machine learning model based on feedback data indicating whether the user completed a transaction using the machine learning model output.

16. A non-transitory computer-readable medium storing a set of instructions for integrating data from multiple unrelated data structures, the set of instructions comprising:

one or more instructions that, when executed by one or more processors of a device, cause the device to:

retrieve one or more of: exchange data relating to exchanges associated with a user, account data relating to an account associated with the user, record data relating to informational records associated with the user, interaction data relating to online interactions associated with the user, or metaverse data relating to metaverse exchanges associated with the user;

obtain at least one of location data or wireless network data associated with a user device associated with the user, wherein the location data indicates a location of the user device that is associated with a first entity, and wherein the wireless network data indicates a wireless network to which the user device has connected that is associated with a second entity;

determine, based on using a machine learning model, a probability of the user acquiring an item in a future time interval based on at least one of the exchange data, the account data, the record data, the interaction data, or the metaverse data, and at least one of first information relating to the first entity or second information relating to the second entity, wherein each type of data, that output of the machine learning model is based on, are incompatible from each other and from different data structures;

transmit information based on the probability of the user acquiring the item; and perform, based on transmitting the information, at least one action associated with:

configuring an extended reality content based on the machine learning model output, or generating a new communication session based on the machine learning model output.

17. The non-transitory computer-readable medium of claim 16, wherein the item is a vehicle.

18. The non-transitory computer-readable medium of claim 16, wherein the one or more instructions, that cause the device to obtain at least one of the location data or the wireless network data, cause the device to:

obtain at least one of the location data or the wireless network data from a user device of the user.

19. The non-transitory computer-readable medium of claim 16, wherein the information identifies the user, the future time interval, and the item.

20. The non-transitory computer-readable medium of claim 16, wherein the metaverse data relates to at least one of an exchange of a non-fungible token or an exchange for a digital item.

* * * * *